(12) United States Patent
Morikawa

(10) Patent No.: US 7,684,977 B2
(45) Date of Patent: Mar. 23, 2010

(54) USER ADAPTIVE SYSTEM AND CONTROL METHOD THEREOF

(75) Inventor: Koji Morikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 34 days.

(21) Appl. No.: 11/449,852

(22) Filed: Jun. 8, 2006

(65) Prior Publication Data

US 2006/0287850 A1 Dec. 21, 2006

Related U.S. Application Data

(63) Continuation of application No. PCT/JP2005/001219, filed on Jan. 28, 2005.

(30) Foreign Application Priority Data

| Feb. 3, 2004 | (JP) | ............................ 2004-026647 |
| Sep. 22, 2004 | (JP) | ............................ 2004-275476 |

(51) Int. Cl.
G10L 19/14 (2006.01)
G10L 15/00 (2006.01)
G10L 13/06 (2006.01)
G10L 11/00 (2006.01)
G10L 21/00 (2006.01)

(52) U.S. Cl. ..................... 704/211; 704/231; 704/250; 704/266; 704/275; 704/278

(58) Field of Classification Search .................. None
See application file for complete search history.

(56) References Cited

U.S. PATENT DOCUMENTS

| 5,717,823 A | * | 2/1998 | Kleijn | ....................... 704/220 |
| 5,749,071 A | * | 5/1998 | Silverman | ................... 704/260 |
| 6,370,503 B1 | | 4/2002 | Ortega et al. | |
| 6,490,553 B2 | * | 12/2002 | Van Thong et al. | ......... 704/211 |
| 6,499,014 B1 | * | 12/2002 | Chihara | ....................... 704/260 |
| 6,795,808 B1 | * | 9/2004 | Strubbe et al. | .............. 704/275 |

(Continued)

FOREIGN PATENT DOCUMENTS

CN 1279461 A 1/2001

(Continued)

OTHER PUBLICATIONS

Nicole Yankelovich, Gina-Anne Levow, Matt Marx. Designing SpeechActs: Issues in Speech User Interfaces. 1995. MIT AI Laboratory.*

(Continued)

*Primary Examiner*—Richemond Dorvil
*Assistant Examiner*—Matthew H Baker
(74) *Attorney, Agent, or Firm*—Harness, Dickey & Pierce, P.L.C.

(57) ABSTRACT

In an interface unit, an input section obtains an input signal of user's speech or the like and an input processing section processes the input signal and detects information relating to the user. On the basis of the detection result, a response contents determination section determines response contents to the user. While, a response manner adjusting section adjusts a response manner to the user, such as speech speed and the like, on the basis of the processing state of the input signal, the information relating to the user detected from the input signal, and the like.

7 Claims, 14 Drawing Sheets

U.S. PATENT DOCUMENTS

| | | | |
|---|---|---|---|
| 7,096,183 B2* | 8/2006 | Junqua | 704/258 |
| 7,143,029 B2* | 11/2006 | Elshafei | 704/211 |
| 7,295,982 B1* | 11/2007 | Cohen et al. | 704/270 |
| 7,337,108 B2* | 2/2008 | Florencio et al. | 704/208 |
| 7,412,378 B2* | 8/2008 | Lewis et al. | 704/211 |
| 7,480,613 B2* | 1/2009 | Kellner | 704/231 |
| 2002/0150869 A1* | 10/2002 | Shpiro | 434/156 |
| 2003/0028375 A1* | 2/2003 | Kellner | 704/235 |
| 2003/0163311 A1* | 8/2003 | Gong | 704/250 |
| 2003/0163314 A1* | 8/2003 | Junqua | 704/260 |
| 2003/0220796 A1 | 11/2003 | Aoyama et al. | |
| 2006/0031073 A1* | 2/2006 | Anglin et al. | 704/270 |
| 2006/0074650 A1* | 4/2006 | Shao et al. | 704/231 |
| 2007/0100628 A1* | 5/2007 | Bodin et al. | 704/261 |

FOREIGN PATENT DOCUMENTS

| | | |
|---|---|---|
| JP | 61-73985 A | 4/1986 |
| JP | 62-145322 A | 6/1987 |
| JP | 4-344930 A | 12/1992 |
| JP | 08-044520 | 2/1996 |
| JP | 09-81350 | 3/1997 |
| JP | 09-152926 | 6/1997 |
| JP | 09-212568 | 8/1997 |
| JP | 10-111786 | 4/1998 |
| JP | 2000-194386 A | 7/2000 |
| JP | 2000-330676 | 11/2000 |
| JP | 2000-347690 | 12/2000 |
| JP | 2001-34293 A | 2/2001 |
| JP | 2003-150194 | 5/2003 |
| JP | 2003-150194 A | 5/2003 |
| JP | 2003-255991 A | 9/2003 |
| JP | 2004-258290 A | 9/2004 |

OTHER PUBLICATIONS

Yoshinobu Yamamoto et al., Computation system and interaction: Consideration relating to factor for increasing amenity, Japanese Cognitive Science Society, Cognitive Science, vol. 1, No. 1, pp. 107-120, published by Kyoritsu Shuppan Co., Ltd., May, 1994.

Etsuko Harada, "Agency in speech interface and effects of social context: Study through message sending experiment", Japanese Cognitive Science Society, 19th conference, pp. 14-15, Jun. 2002.

Tomio Watanabe, "Entrainment and physicality in physical communication: Through development of relating physical communication system", E-COSMIC, Baby Science, vol. 2, pp. 4-12, 2002.

* cited by examiner

| Speech contents | Speech speed | Recognition degree |
|---|---|---|
| A: Bring a box to me. | 100 | 60 |
| B: Which box? | 80 | |
| A: White one. | 90 | 80 |
| B: Here it is. | 90 | |

FIG. 10

| Subject ID | Speech speed (characters/second) |
|---|---|
| 1 | 10.69 |
| 2 | 8.01 |
| 3 | 8.90 |
| 4 | 8.91 |
| 5 | 8.17 |
| 6 | 6.88 |
| 7 | 9.48 |
| 8 | 7.56 |
| 9 | 10.06 |
| 10 | 9.76 |

FIG. 13

| Subject ID | Conversation number & speech speed | | |
|---|---|---|---|
| | First | Second | Third |
| 1 | 2-H | 5-L | 9-M |
| 2 | 2-H | 5-M | 9-L |
| 3 | 2-M | 5-H | 9-L |
| 4 | 2-M | 5-L | 9-H |
| 5 | 2-L | 5-H | 9-M |
| 6 | 2-L | 5-M | 9-H |

USER ADAPTIVE SYSTEM AND CONTROL METHOD THEREOF

CROSS REFERENCE TO RELATED APPLICATIONS

This is a continuation of Application PCT/JP2005/001219 filed on Jan. 28, 2005. This Non-provisional application claims priority under 35 U.S.C. §119(a) on Patent Applications No. 2004-026647 filed in Japan on Feb. 3, 2004, and No. 2004-275476 filed in Japan on Sep. 22, 2004, the entire contents of which are hereby incorporated by reference.

BACKGROUND OF THE INVENTION

1. Field of the Invention

The present invention relates to a system including an interface that provides information or service upon receipt of an input from a user, and specifically relates to a home use robot, an information terminal, a home electric appliance, and the like working through interaction with a user.

2. Description of the Prior Art

Between a user and an appliance preconditioned to be used by the user, an interface is necessary. As one kind of interfaces, an adaptive interface is offered which adjusts information or service to be provided according to a history of interaction between the user and the appliance. The adaptive interface enables the appliance to adapt according to difference or personality of the user, thereby realizing a user-friendly interface.

Conventional adaptive interfaces include an interface that stands for operation through observation of user's operation sequence, an interface that composes a human-friendly interface with pseudo feeling presented to the user, an interface adapted according to biometric information, and the like. In a broad sense, a function of information recommendation can be an adaptive interface in view of presenting information suitable for each user.

In order to provide user-friendly interfaces, such adaptive interfaces are so composed to (1) receive user's specific state or an input from a user, (2) judge the user's state, and (3) adjust service or an interface.

Patent Document 1 and Patent Document 2 show prior art examples relating to improvement on the above adaptive interface.

For example, Patent Document 1 proposes a method for adjusting a state adapting to the user in an example of a machine translation system. In machine translation, dictionaries of translation examples, vocabularies, and the like necessary for translation vary depending on a genre of an input text (news story, manual, or the like), and therefore, the genres thereof are changed adaptively. However, the genre change is not necessarily done successfully. Under the circumstances, candidates of a genre to be exchanged are proposed to the user for increasing accuracy of genre specification. This aims at providing a countermeasure in case of unsmooth adaptation in an adaptive interface.

Referring to Patent Document 2, interface layout or the like is determined on the bases of a model called a pseudo feeling in an example of a GUI interface of a WEB browser. Specifically, an interface element is used as one creating a pseudo feeling and an expression of the feeling is presented as interface layout. This interface utilizes a characteristic of human's pseudo feeling variation, and therefore, it can be said that adaptation of a user interface suitably for human's feeling is realized.

Further, there are Non-patent Documents 1, 2, and 3 showing noteworthy knowledge relating to an interface between a human and a machine.

Non-patent Document 1 reports that: in the case where the user plays a game (last and first) with a human or a computer through a network, duration of user's interest and user's reaction differed between when a human is specified as the adversary and when the computer is specified as the adversary even when the user's adversary is fixed to the same computer program.

Non-patent Document 2 obtained the result that: after a user carried out a task of transmitting a message to a robot, a computer screen, and a human, the user confessed in an interview that he/she felt difference in speech ease.

Further, Non-patent Document 3 reports that: in communication between humans, not only verbal information through language but also non-verbal information such as peripheral language of speech, a nod, a blink, expression, body gesture, hand gesture, and the like causes generally-called entrainment where a talker and a hearer are drawn in mutually, thereby attaining smooth communication. Further, there is indication that physiological entrainment such as entrainment of variation in hart beat interval, which relates intimately to affection variation, and entrainment of breath, plays an important role.

Patent Document 1: Japanese Patent Application Laid Open Publication No. 9-81350A Patent Document 2: Japanese Patent Application Laid Open Publication No. 2000-330676A Patent Document 3: Japanese Patent Application Laid Open Publication No. 2003-150194A Non-patent Document 1: Yoshinobu Yamamoto, Takao Matsui, Kazuo Seki, Satoshi Umeda, and Yuichiro Anzai, "Computation system and interaction: Consideration relating to factor for increasing amenity, Japanese Cognitive Science Society, Cognitive Science, Vol. 1, No. 1, pp. 107-120, published by KYORITSU SHUPPAN CO., LTD., May, 1994

Non-patent Document 2: Etsuko Harada, Agency in speech interface and effects of social context: Study through message sending experiment, Japanese Cognitive Science Society, 19$^{th}$ Conference, pp. 14-15, June, 2002

Non-patent Document 3: Tomio Watanabe, Entrainment and physicality in physical communication: Through development of relating physical communication system, E-COS-MIC, Baby Science, Vol. 2, pp. 4-12, 2002

SUMMARY OF THE INVENTION

The adaptive interface aims at realizing a further user-friendly interface by adapting to the user, and various devices for further suitable adaptation to the user have been contrived. However, appliances are not always and necessarily adaptable to the user in real-world application.

Though the conventional constitutions are devised to be adaptable to the user under appliance's presupposition, less study has been exhausted for the case where the user takes an action beyond the presupposition. Also, there is the case where an appliance has no ability to perform such working in practice though the appliance knows how to adapt. Insufficient examination has been done for providing countermeasures in such a situation. Currently proposed techniques are mere presentation of information sorted as an error message.

However, mere repeated presentation of a message such as "not known," "not understood," "once more please," or the like makes the user to feel belied against user's expectation and discouraged because he/she operates the system with system's reaction expected. Repetition of this situation causes the user to feel that operation of the system means a vain attempt, and the user would not use the system after a while.

In view of the foregoing, the present invention has its object of realizing, in an appliance including an interface with a user, smooth interaction between the user and the appliance by not only merely responding to the user but also inviting change in user's action and impression without making the user to be so conscious with the fact that the appliance cannot always adapt to the user taken into consideration.

The present invention focuses attention on the following points: appliance's working on the user can be grouped into to contents themselves of information or service to be provided and a providing manner thereof (a response manner to the user). Adjustment of the response manner to the user is considered to be able to change user's action and user's impression that the user gets from the appliance. This point of view is utilized positively in the present invention.

The concept thereof will be described below in sequence.

In cases of systems that presents information to the user, in some cases, different response manners result in different impressions that the user gets or different reactions of the user even when the contents of the information is the same.

For example, in speech interaction, speech of "sorry" corresponds to the contents of information when the appliance apologizes to the user, and agent's speech speed, intonation, motion of bowing displayed on a screen, and the like correspond to the response manner to the user. In this case, the speech of "sorry" can cause the user to feel that it does not apologize or to be further disgruntled depending on an information presenting manner such as its speech speed, intonation, agent's gesture, and the like.

Further, in the case where speech of "what kind of food would you like?" to the user for restaurant retrieval in a car navigation or an information terminal, change in speech speed or intonation can give various impressions to the user. For example, fast talking speed may add an implication of a request for "a quick answer," and an impression of "questioning without interests" may be given depending on intonation.

Consider another example, namely, the case where a home use robot gives a cup to the user. In robot's response action to a request for "bring my cup to me," there are various ways in moving the robot's hand and in its action speed when giving the cup to the user. Though the service of giving the cup to the user can be realized, the user may gets various impressions such as "it is reluctant service," "it gives feeling of fear," "it is abrupt action," and the like depending on the response manner such as its action, its speed, and the like.

As described above, the impression that the user gets may differ absolutely depending on adjustment of the response manner even when the same information or service is provided.

Further, the aforementioned Non-patent Document 1 suggests that: a human may spend time enjoyably or boringly depending on user's illusion in operating an appliance. Also, Non-patent Document 2 indicates that user's reaction would change depending on the type of appliance that the user is confronting. These cases prove that: (1) the user changes his/her aspect of reaction to the appliance depending on user's impression or illusion to the appliance; and (2) the user may change his/her sense of usability depending on the aspect of the appliance that the user is confronting.

Reconsideration of the above knowledge in view of interface design leads to an idea that user's impression or reaction may be controlled by adjusting a response manner to the user as an interface even in a case of providing the same information or service. This is the key point of the present invention.

Adjustment of the response manner to the user could be subsidiary means for transmitting information.

On the basis of what the response manner to the user should be adjusted will be examined next.

Several sorts of information may be considered as information used as an index for adjusting the response manner. For example, the amount of internal processing completed in the appliance, that is, a processing state of an input signal may be used as an index.

For example, when appliance's processing does not catch up with the user, an implicit message that "more slow speaking is requested" or "the appliance that you are confronting cannot cope at such fast speed" can be informed to the user by providing information contents to the user and adjusting the providing manner thereof. In so doing, it is anticipated that the user would understand that the appliance does not catch up with the user consciously or unconsciously and would change his/her reaction to the appliance naturally. Referring to, for example, adjustment of speech speed as an information providing manner, when the appliance adjusts the speech speed of its own in a descendent direction (slower speech) when the internal processing cannot catch up with the user's speech or the like, the user may feel appliance's inability of catching up with him/her and may decrease his/her speech speed. This intends to establish the entrainment phenomenon in communication between humans indicated in Non-patent Document 3 even between the user and the appliance.

Wherein, Patent Document 3 discloses that: in a case of mis-recognition caused due to user's fast speech, system's speech is performed at speech speed lower than the user's speech speed to naturally lead to user's speech at slow and recognition-easy speed.

The response manner to the user may be adjusted on the basis of information detected from an input signal, such as user's state, mood, or the like or may be adjusted according to degree of established interaction between the user and the appliance. Furthermore, in an appliance that learns knowledge relating to the user, the response manner may be adjusted according to its learning degree.

Moreover, the present inventors have acquired novel findings from experiments, which will be described later, that invitation from an appliance does not necessarily draw the user in. From the novel findings, the present inventors have considered that combinational use of natural inducement and constrained inducement to the user is favorable. The combination of natural inducement and constrained inducement makes the user who is naturally induced to be induced unconsciously and makes the user who is not naturally induced to be induced surely through constrained inducement. In other words, the user is induced surely with least opportunity of causing user's unpleasant feeling.

In sum, the present invention provides a user adaptive system for performing interaction with a user, wherein an input signal that indicates at least one of user's action, state, and request is obtained, information relating to the user are detected by processing the thus obtained input signal, response contents to the user is determined on the basis of the detection result while a response manner to the user is adjusted on the basis of at least one of a processing state of the input signal, the information relating to the user detected from the input signal, and a learning degree of knowledge relating to the user, and then, the thus determined response contents are output in the thus adjusted response manner. Then, user's reaction to the output is detected. When no change in user's reaction which is expected from the adjusted response manner is observed, response contents for inviting user's change in reaction are determined.

In the present invention, the response contents to the user are determined according to the information relating to the user detected by processing the input signal while the response manner to the user is adjusted on the basis of at least one of the processing state of the input signal, the information relating to the user detected from the input signal, and the learning degree of knowledge relating to the user. This enables adjustment of the response manner that invites change in user's action or impression, realizing natural inducement to the user and smooth interaction between the user and the system. Further, when no change in user's reaction which is expected from the adjusted response manner is observed, the response contents for inviting user's change are determined, enabling constrained inducement to the user.

The conventional adaptive interface observes user's state and adjusts to the user, thereby contemplating improvement on convenience. While in the present invention, change in user's action or impression to the system is invited in adjusting the response manner with the fact that the system cannot necessarily adapt to the user taken into consideration. Thus, even under a situation that the user may feel dissatisfaction conventionally, the user's dissatisfaction can be lessened by inviting user's change in impression and the system can play a role as a smooth interface.

Examples of the response manner to the user which is adjusted for inviting change in user's action or impression will be indicated next.

In the case where a system performs speech in speech interaction, speech speed, vocabulary to be used, and intonation are adjusted as the response manner to the user.

In the case where an appliance such as a robot or the like performs motion by an actuator, such as "holding," "raising," "giving," or the like, the motion speed of the actuator is adjusted as the response manner to the user.

In the case where an appliance recommends useful information, agent's aspect displayed on a screen, for example, face expression or clothes is adjusted as the response manner to the user.

According to the present invention, adjustment of the manner of responding to the user from an appliance enables invitation of user's change in impression or action to the appliance, realizing further smooth communication between the user and the appliance. Also, when no change in user's reaction which is expected from the adjusted response manner is observed, constrained inducement to the user can be enabled.

BRIEF DESCRIPTION OF THE DRAWINGS

FIG. 10 is a list indicating speech speeds at solo speech in sentence readout by subjects, which are obtained in Experiment 1.

FIG. 13 is a list showing interaction sequences in Experiment 2.

DESCRIPTION OF THE PREFERRED EMBODIMENTS

Figure 1:
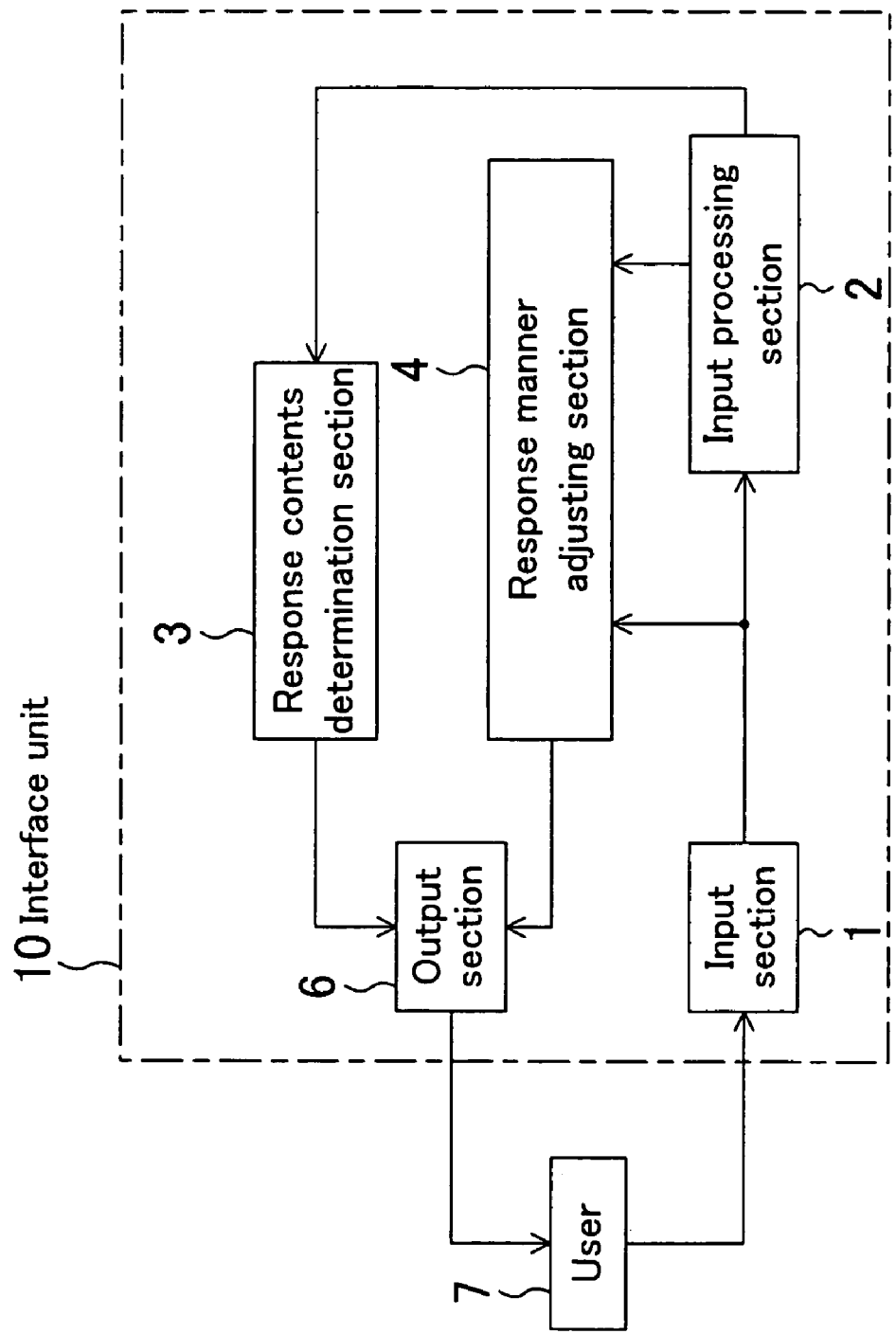
FIG. 1 is a conceptual diagram showing a constitution of the present invention.

The main concept of the present invention will be described first with reference to the conceptual diagram of FIG. 1. FIG. 1 is a diagram showing the conception of a constitution of an interface unit 10 in a user adaptive system according to the present invention. The interface unit 10 as shown in FIG. 1 is incorporated as a part of a user adaptive system that provides a function or information to a user 7, such as a robot, an information terminal, and the like. The interface unit 10 provides information relating to the user 7 to another constitutional element of the system and provides response to the user upon receipt of an output from another constitutional element thereof.

An input section 1 receives an action from the user 7. The action from the user 7 may be user's speech, gesture, expression, operation of a switch, a keyboard, or a mouse, physiological condition, or the like. The input section 1 includes a sensor for taking the information into an appliance or is capable of communicating with such a sensor so that the user's information is taken in as an electric signal capable of being processed within the appliance. In other words, the input section 1 obtains an input signal indicative of at least one of user's 7 action, state, and request.

An input processing section 2 processes the input signal obtained in the input section 1 and converts it to level expression of the user's 7 state, intention, or request. Namely, the user's 7 information is detected.

A response contents determination section 3 determines appliance's reaction from the user's state, intention, or request obtained in the input processing section 2 and output it to an output section 6. In short, it determines response contents to the user 7 on the basis of the detection result by the input processing section 2.

A series of processing flow from the input section 1 to the input processing section 2, the response contents determination section 3, and then, to the output section 6 is the same as that in the conventional interface. Wherein, in the present invention, a response manner adjusting section 4 for adjusting a response manner to the user 7 is provided therein.

The response manner adjusting section 4 adjusts a response manner to the user 7. As already described, the contents themselves of information or service to be provided to the user 7 and its providing manner can be separated and can be controlled comparatively independently. One of significant features of the present invention lies in that the response manner is changed for facilitating adaptation by the user. Wherein, the user's adaptation at that time is not intentional and is done as a result of a natural reaction, and the response manner is adjusted so as to invite such a natural reaction. This allows the user 7 to feel no dissatisfaction at the system, resulting in smooth communication with the system.

Herein, the response manner is adjusted according to how smooth exchange of information or service between the user and the system is performed. Alternately, the response manner is adjusted according to how working that the appliance can cope matches user's request.

Specifically, for example, it may be adjusted according to a processing state of the input processing section 2. For example, in a case of a system that performs speech interaction with the user, the response manner such as speech speed or the like is adjusted according to the processing state of speech recognition processing. From the processing state of the speech recognition processing, whether or not the speech recognition is performed in due course or whether or not the speech interaction with the user can be established is detected.

Further, the response manner may be adjusted according to information relating to the user 7 detected from the input signal. For example, in a case of speech interaction, it may be adjusted according to user's reaction (for example, whether or not a token of not understanding language is observed) to a synthetic speech output. In a case of collaboration with a robot, it may be adjusted according to accord degree between the robot and the user (according to whether or not the collaboration is performed with no disaccord).

Moreover, in the case where the system has a function of learning knowledge relating to the user, such as user's preference, the response manner may be adjusted according to learning degree thereof. Of course, the response manner may be adjusted on the basis of information other than the foregoing and may be determined on the basis of plural pieces of information in combination.

Embodiments of the present invention will be described below with reference the drawings.

Embodiment 1

In Embodiment 1 of the present invention, description is made with reference to an appliance having a function of speech interaction. The present invention presupposes an appliance capable of receiving an action through user's speech and capable of working on the user through a synthetic speech, namely, presupposes a generally-called appliance capable of speech interaction, such as an information terminal, a home use robot, or the like. These appliances provide desired information or service to the user through communication between the user and the appliances, similarly to communication between humans.

In general, when the user speaks to an appliance through a speech, the user waits for some appliance's action with expectation. When the appliance works as expected, the user can use the appliance naturally. While, when the appliance often works against the expectation, the user may feel a credibility gap to the appliance. Currently, smooth speech communication is not necessarily realized between a humanoid and the user. One of the reasons therefor is that the humanoid cannot perform conversation not so well as the user expected from its looks and talk. This is opposite to a phenomenon that communication between the user and a cat robot or a dog robot seems to be held good even though vocabulary and a speech manner thereof are limited.

An image where the present embodiment is realized will be described first with reference to FIG. 2 and FIG. 3.

Figure 2:
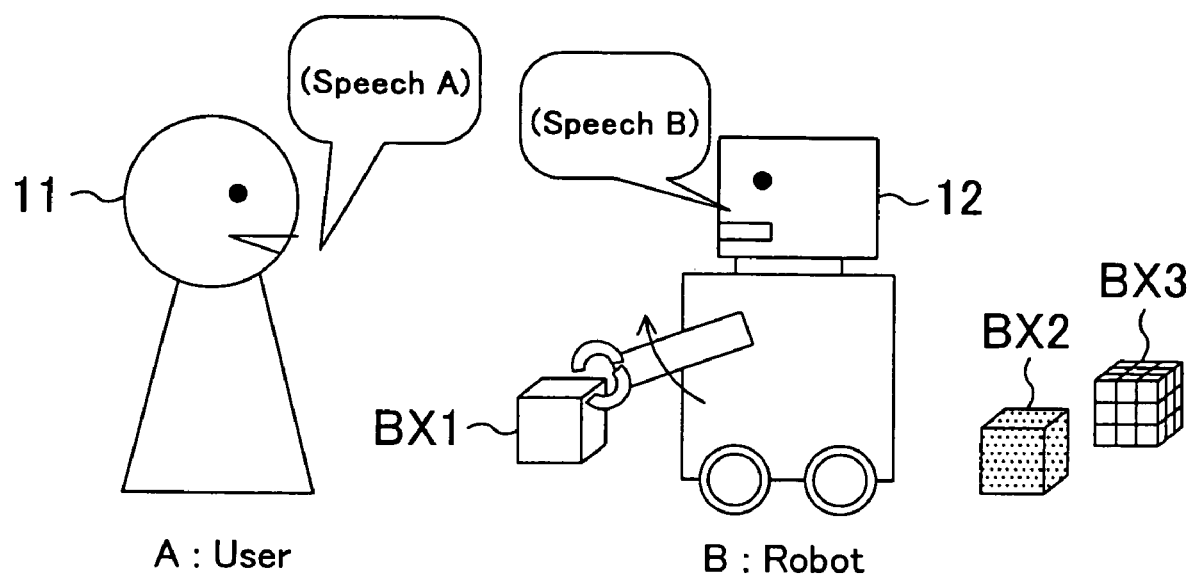
FIG. 2 is a conceptual illustration of Embodiment 1 and shows a situation where a home use robot brings a box with a user.

FIG. 2 is an illustration conceptually showing a situation where a home use robot brings a box with a user. In FIG. 2, reference numeral 11 denotes a user, 12 denotes a home use robot having an interface function according to the present invention, and BX1, BX2, and BX3 each denote a box. The user 11 informs his/her request to the robot 12 through a speech. Herein, the user 11 requests the robot 12 to "bring the white box BX1." The robot 12 responds to the user 11 through a speech and performs working in accordance with the user's 11 request. Further, the robot 12 adjusts speech speed of its own according to recognition degree of user's 11 speech.

Figures 3A, 3B:
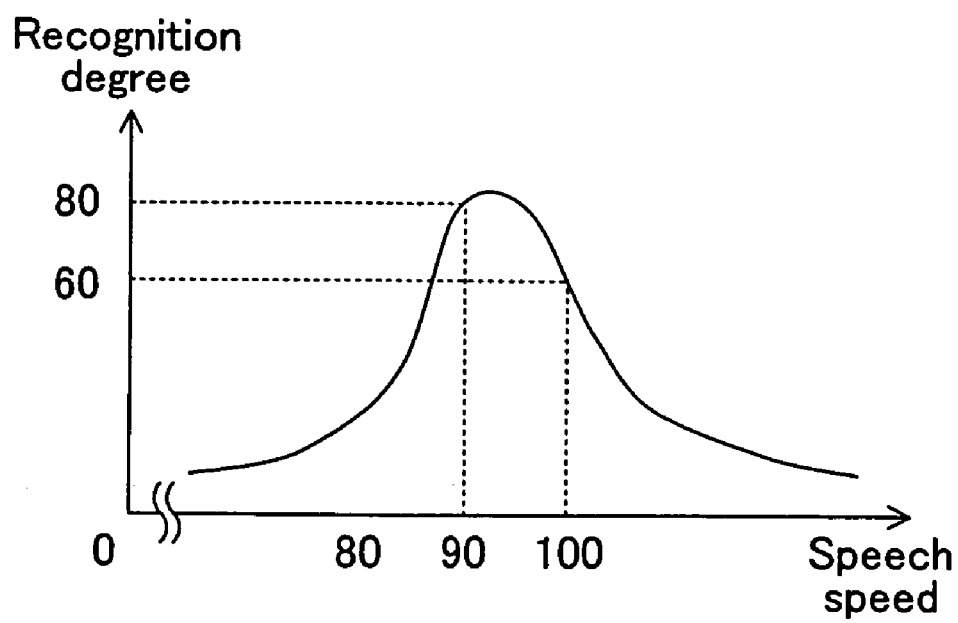
FIG. 3A shows an example of interaction under the situation in FIG. 2
FIG. 3B is a graph indicating the relationship between speech speed and recognition degree.

FIG. 3A indicates an interaction example in the situation shown in FIG. 2, wherein A denotes user's 11 speeches and B denotes robot's 12 speeches. FIG. 3A indicates speech speeds in respective speech contents and additionally indicates, beside the user's 11 speeches A, recognition degrees indicating how well the recognition processing proceeds in the robot 12. FIG. 3B is a graph showing the relationship between the speech speed and the recognition degree. Herein, convenient numerals are given to the speech speeds and the recognition degrees for the sake of simple explanation.

First, the user 11 requests the robot 12 to "bring a box to me." Suppose that user's speech speed at that time is 100 and the recognition degree is 60. In general, speech recognition processing exhibits recognition performance the most at an appropriate speech speed, which is around 90 according to the relationship shown in FIG. 3B. Herein, a target value of the user's speech speed is set to 90. Since the current user's 11 speech speed is higher than the target value, the robot 12 takes a course of action to lower the user's 11 speech speed. Herein, specifically, the robot's 12 own speech speed is lowered to 80, which is lower than the target value 90, for facilitating adaptation by the user 11.

Further, the robot 12 cannot specify which box of BX1, BX2, and BX3 should be brought with the user 11, and therefore, speech contents for confirming which box the user 11 wishes to receive are generated. As a result, the robot 12 asks the user 11 "which box?" at the speech speed 80.

In response to the robot's 12 question, the user 11 answers "white one." At that time, the user 11 is influenced by the robot's 12 speech speed, so as to lower his/her speech speed especially unconsciously. As a result, the user' 12 speech speed is changed to 90, so that the recognition degree is improved to 80 remarkably. In this way, the robot 12 transmits the speech contents to the user 11 while working on the user 11 so as to perform the recognition processing well.

The robot 12 correctly recognizes that the task the user 11 are requesting is "to bring the white box BX1 to the user 11," and gives the white box BX1 to the user 11 with speech "here it is." At that time, the user's 11 speech speed is an appropriate value that the robot 12 can perform the recognition processing well, and adaptation facilitatation becomes unnecessary. Accordingly, the robot's 12 own speech speed is adjusted to 90, which is the same as the user's one.

Thereafter, the user 11 and the robot 12 can communicate with each other at the speech speed appropriate to the recognition processing. Further, if the user 11 would change his/her speech speed and the recognition degree would be lowered, the robot's speech speed may be adjusted to be appropriate as described above. In this way, the robot 12 carries out the task that the user 11 is requesting while controlling the user's 12 speech speed towards an appropriate range by adjusting its own speech speed, thereby maintaining the system so that the recognition processing can be performed appropriately all the time.

It is noted, as described above, that when the user's speech speed is higher than a target value, the system's speech speed is set lower than the target value. This makes it easy to bring the user's speech speed close to the target value. When the user's speech speed becomes close to the target value, the system's speech speed is preferably changed from the initial set value to approximately the target value. For example, after the user's speech speed is induced to be approximately the target value, the system sets again its speech speed to a target value which eases communication and is close to the user's speech speed with no necessity of inducing change in user's speech speed.

In reverse, when the user's speech speed is lower than the target value, the system's speech speed is set higher than the target value. This makes it easy to bring the user's speech speed close to the target value. In this case, also, when the user's speech speed becomes close to the target value, the system's speech speed is preferably changed from the initial set value to approximately the target value. For example, after the user's speech speed is induced to be approximately the target value, the system sets again its speech speed to a target value which eases communication and is close to the user's speech speed with no necessity of inducing change in user's speech speed.

Further, the target value of the user's speech speed is not necessarily determined according to only system's convenience. As will be described later, the speech speed differs among individuals, and therefore, the target value of user's speech speed is preferably determined according to each user. By setting the target value to a value close to the user's speech speed within the range that the recognition performance can be obtained appropriately, inducement to the user's change in speech speed is enabled without making the user feel unpleasant to the system's speech. For example, for a person who speaks slowly, the target value may be set to approximately a lower limit value of the range of the speech speed where the recognition performance can be obtained appropriately, rather than the optimum value for the system. In contrast, for a person who speaks fast, the target value may be set to approximately an upper limit value of the speech speed of the range where the recognition performance can be obtained appropriately.

Figure 4:
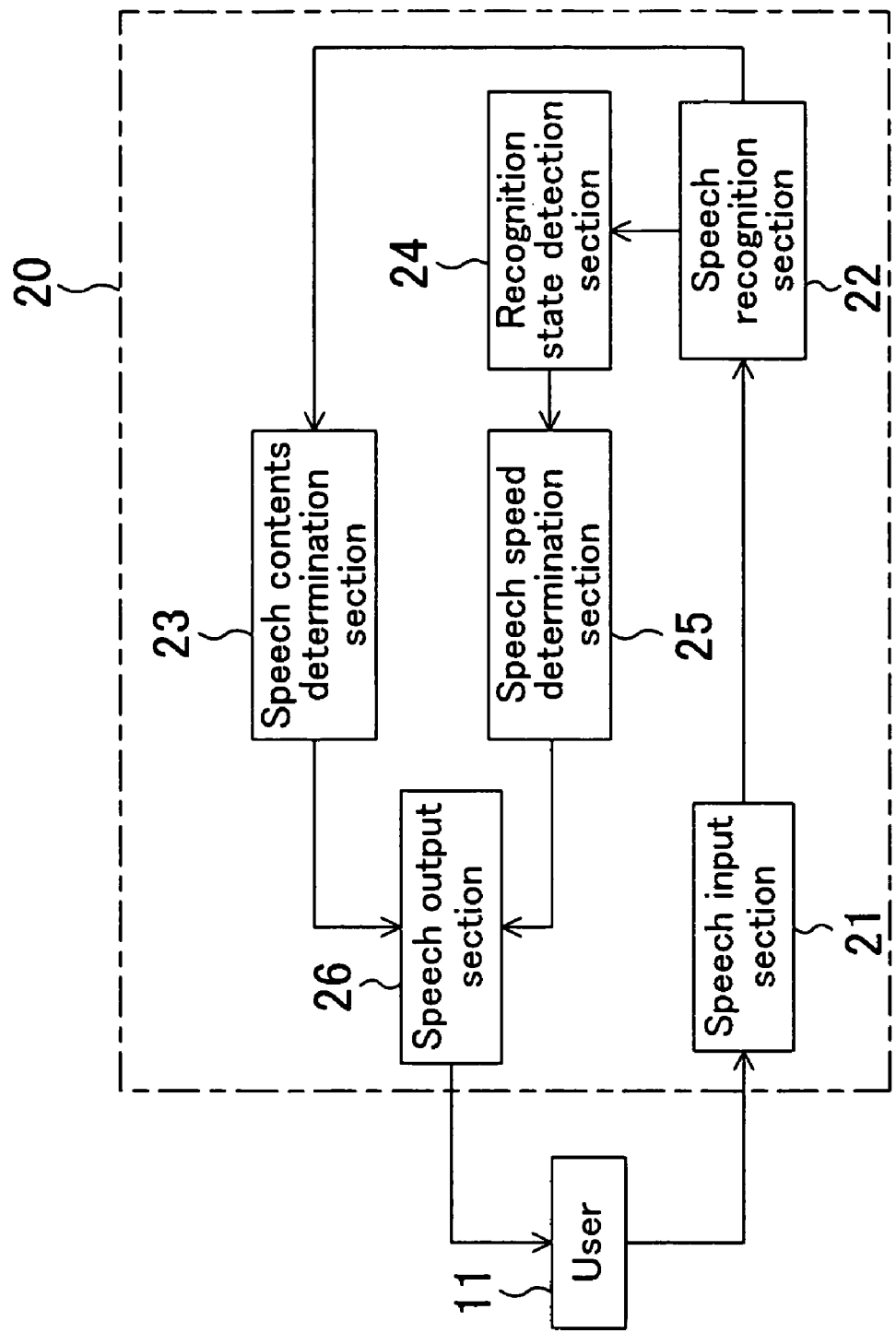
FIG. 4 is a block diagram showing a constitution of an interface unit of a user adaptive system according to Embodiment 1 of the present invention.

A control method according to the present embodiment will be described below in detail. FIG. 4 is a block diagram showing a constitution of an interface unit 20 in the user adaptive system according to the present embodiment. In the above example, the interface unit 20 shown in FIG. 4 is incorporated in the robot 12. In FIG. 4, a recognition state detection section 24 and a speech speed determination section 25 correspond to the response manner adjusting section. A speech input section 21, a speech recognition section 22, a speech contents determination section 23, and a speech output section 26 correspond to the input section, the input processing section, the response contents determination section, and the output section, respectively.

The speech input section 21 obtains a speech input from the user 11 and is generally composed of a microphone or the like for obtaining a speech. A speech that the user 11 makes is converted by the speech input section 21 to an electric signal capable of being processed within the interface unit 20.

The speech recognition section 22 processes the speech electric signal obtained in the speech input section 21 and converts it to speech contents of the user 11. In other words, it performs generally-called speech recognition processing. The speech contents determination section 23 determines speech contents to the user 11 on the basis of the speech recognition result processed in the speech recognition section 22. The speech contents determination section 23 stores various kinds of conversation examples as a rule or a knowledge base, such as "you're welcome" in response to "thank you," "it is XX" in response to "where is YY?," and the like.

The recognition state detection section 24 obtains a signal relating to a recognition state from the speech recognition section 22 and checks the quality of the recognition state. A speech of the user 11 is not always easy for speech recognition processing, and therefore, the processing result thereof often includes an error. Almost all speech recognition processing can obtain a signal indicative of reliability of the processing result. For example, in speech recognition utilizing a neural network, an output value output with a candidate of each recognition result can be used as reliability degree of the recognition result. In the case where such an output value within the range between 0 and 1 is obtained, recognition results with output values of, for example, 0.9, include less error. In contrast, recognition results with input values of 0.5 can be read as meantime outputs with low reliability degree. The recognition state detection section 24 computes the quality degree of the recognition state from such a value obtained from the speech recognition section 22.

The speech speed determination section 25 determines system's speech speed relative to the user 11 on the basis of the degree of recognition state computed in the recognition state detection section 24. Specifically, for example, a value of the system's speech speed stored as an internal parameter in the interface unit 20 is adjusted. It is generally known that in speech recognition processing, the recognition rate becomes the highest at a given appropriate speech speed and is lowered as user's speech speed disaccords therewith.

The speech output section 26 is composed of, for example, a speaker and a circuit section including a D/A converter, and generates and outputs a synthetic speech indicating the speech contents determined in the speech contents determination section 23 at the speech speed determined in the speech speed determination section 25.

Figure 5:
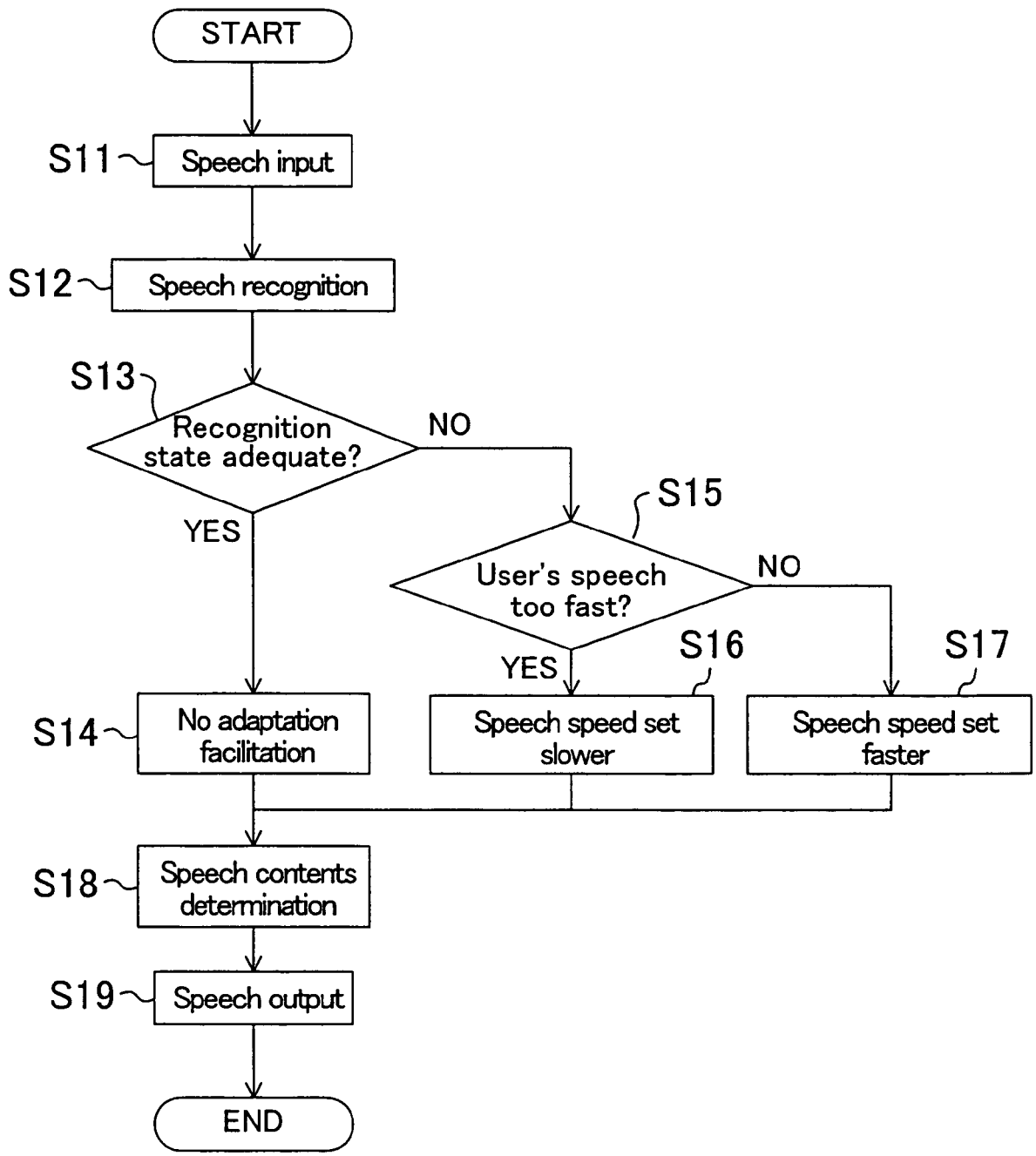
FIG. 5 is a flowchart showing an operation of the constitution in FIG. 4.

An operation of the constitution shown in FIG. 4 will be described with reference to the flowchart of FIG. 5.

When the user 11 makes a speech, the speech input section 21 obtains the speech first and converts it to an electric signal (S11). With the use of the electric signal generated in the step S11, the speech recognition section 22 performs speech recognition processing (S12).

Next, the recognition state detection section 24 judges whether or not the recognition state of the speech recognition is adequate on the basis of the signal obtained from the speech recognition section 22 (S13). The judgment herein is performed on the basis of, for example, dispersion of data indicating reliability degrees of a plurality of candidates specified in the speech recognition processing, such as output values in the aforementioned neural network. Specifically, the recognition state is judged adequate when the reliability degree of only a specific candidate is high or is judged inadequate when the reliability degree of every candidate is low. As well, when any recognition candidate cannot be obtained as a result of failure of the recognition processing, the recognition state is judged inadequate.

When the recognition state is judged adequate in the step S13, the routine proceeds to a step S14. In the step S14, no control of the speech speed for adaptation facilitation is performed in the speech speed determination section 25. The system's speech speed is set to, for example, the same value as a value set at previous time or to the user's speech speed. The system's speech speed is set to the user's speech speed because the system's speech speed might be close to the user's speech speed in appropriate communication.

On the other hand, when the recognition state is judged inadequate, the routine proceeds to a step S15. In the step S15, the recognition state detection section 24 judges whether or not the user's 11 speech speed is too fast. Specifically, the current user's 11 speech speed is computed from the recognition state in the speech recognition section 22, and the computed speech speed is compared with optimum speech speed that the interface unit 20 stores in advance. When the user's 11 speech speed is faster (YES), the speech speed determination section 25 sets the system's speech speed slower than the currently set system's speech speed (S16). On the other hand, when the user's 11 speech speed is slower (NO), the speech speed determination section 25 sets the system's speech speed faster than the currently set system's speech speed (S17). The adjustment of the system's speech speed can be attained by, for example, adding or subtracting a predetermined value to or from the current system's speech speed or by multiplying a predetermined value smaller or larger than 1.

After the system's speech speed is adjusted in the steps S14, S15, and S16 or in parallel to the system's speech speed adjustment, the speech contents determination section 23 determines response contents in response to the user's 11 speech contents recognized in the speech recognition section 22 (S18). Then, the speech output section 26 outputs to the user 11 the speech contents determined in the speech contents determination section 23 at the system's speech speed determined in the speech speed determination section 25 (S19).

When viewing the above described operation from the user 11, the system's speech speed in speech response by the system is changed to some extent in response to the user's 11 speech. The user 11 might increase or decrease his/her speech speed naturally in accord with the system's speech speed by an entrainment phenomenon like one that can be observed in communication between humans. The user 11 performs such change in speech speed unconsciously. In other words, the user's speech speed can be controlled naturally without making the user 11 noticed. This enables input of a recognition-easy speech, increasing the recognition rate and attaining smooth interaction.

In conventional speech-interaction interfaces, a speech of "once more please," "please speak slowly," or the like is performed when the speech recognition is impossible so as to invite the user to speak slowly in accord with the system consciously. Therefore, the interaction until then is interrupted, attaining less usability for the user.

In contrast, in the present embodiment, even when user's speech is obscure, the user is invited to change his/her speech speed unconsciously to attain smooth communication by adjusting the system's speech speed while continuing the interaction. Throughout the interaction, the user's intentional adaptation to the appliance is unnecessary, and a mutual entrainment process between the user and the appliance is realized similarly to that the user performs naturally with another person. Thus, the speech interaction between the user and the appliance can be performed smoothly with no burden imposed on the user.

It is noted that the system's speech speed is adjusted as adjustment of the response manner to the user in the present embodiment but the present invention is not limited thereto. For example, speech vocabulary may be adjusted. Adjustment of the speech vocabulary can change the user's impression when the user hears speech contents. Referring to examples of vocabulary patterns to be changed, there may be, for example, vocabulary used in conversation with children, vocabulary used in conversation with adults, vocabulary different in politeness (for example, polite conversation or rude conversation), vocabulary different in friendliness (friendly conversation or businesslike conversation), and the like.

Alternatively, speech intonation may be adjusted. Intonation adjustment might enable the user to speak slowly, gently, or calmly through the entrainment even in response to the same phrase. Of course, all or a part of the speech speed, vocabulary, intonation, and the like may be combined as a response manner to be adjusted.

Such adjustment of the response manner does not necessarily change user's reaction as estimated by the system. For example, as suggested in the experiment result, which will be described later, some users would not change his/her speech speed in response to the adjusted system's speech speed in interaction with the system. In the case where the adjustment of the response manner would not change user's reaction as estimated, it is preferable to perform output that informs a request to the user directly.

In detail, the input processing section 2 detects user's 7 reaction to the output of the output section 6. When any change, which would be estimated from the response manner adjusted in the response manner adjusting section 4, is not observed in the user's 7 reaction, it is preferable to direct the response contents determination section 4 to determine response contents that invite the user's 7 change. For example, when the user does not change his/her speech speed by changing the system's speech speed, the input processing section 2 directs the response contents determination section 3 to determine response contents which would invite change in user's speech speed. Upon receipt of the direction, the response contents determination section 3 adds a message such as "would you please speak more slowly?" or the like to speech contents for establishing interaction with the user 7. This enables direct transmission of the system's request such as a request for lowering the speech speed to the user 7.

In order to prove that the response manner adjustment influences a human, the following two experiments were carried out. Herein, two experiments were carried out for examining to what degree a human receives influence of partner's speech speed in interaction between humans (Experiment 1) and to what degree a human receives influence of appliance's speech speed in interaction between the human and the appliance (Experiment 2), with human's speech speed in the interaction focused attention.

Experiment 1

In Experiment 1, an experiment as to whether or not the speech speed of a subject is changed according to partner's speech speed was carried out by observing a conversation state between humans and recording and analyzing their speech speeds. In the experiment, ten persons centralized to college students participated.

First, each subject performed sole speech such as news matter reading, and his/her speech speed was set as his/her normal speech speed in a sense that no influence is received from a partner. Wherein, each subject's speech speed was calculated as the number of characters uttered in one second (the number of characters included in a speech uttered per time required for the speech).

FIG. 10 indicates the normal speech speed of each subject. As can be understood from FIG. 10, the speech speeds range from 6.88 characters/second to 10.69 characters/second in the group of the subjects who participated in this experiment. Difference between a subject who speaks the fastest and a subject who speaks most slowly is 1.5 times or greater, which is rather wide dispersion. The average speech speed is 8.84 characters/second.

Next, a conversation experiment between subjects was carried out. For conversation sentences used in this experiment, nine sentence examples were prepared which were usually used in language texts for English conversation or the like. In each sentence example, Mr. A who speaks first and Mr. B who speaks in response to Mr. A were set and each sentence example included several alternate speeches for Mr. A and Mr. B. Employment of such sentence examples generates both interaction of speech contents and interaction of information on speech manners (speech speed in this experiment), and therefore, the influence thereof can be observed.

In this experiment, the 10 subjects were grouped into five pairs, each pair played roles of Mr. A and Mr. B for reading the conversation sentence examples, and the interaction thereof was recorded. Then, the subject pairs were changed so that each subject read another conversation sentence with another partner. The sequence was set for each subject so that he/she read different nine sentence examples with nine different partners. As a result, conversation data of five pairs was obtained in one example, and nine conversations in which subjects' partners were changed attained 45 conversation records in total. Individually, 90 pieces of speech data was obtained in total.

The subject's speech speeds were calculated from the recorded conversation data. The speech speeds were changed even slightly in the conversations. Average speech speeds of the subjects in the conversations were obtained and were regarded as respective subjects' speech speeds in all of the conversations. In other words, this experiment took no account of change in speech speed in one conversation.

Figure 11:
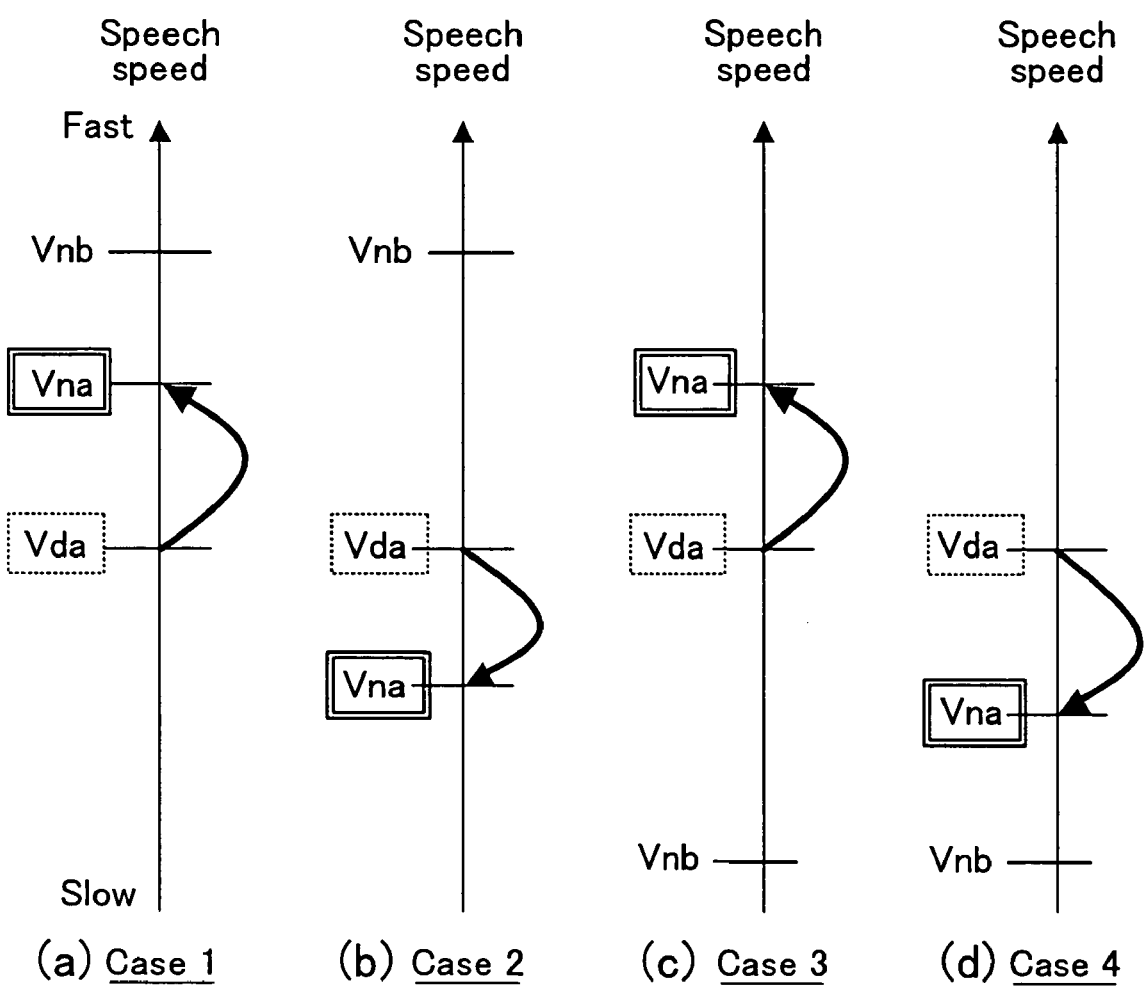
FIG. 11 is a schematic diagram showing classification of change in speech speed.

As illustrated in FIG. 11, the change in speech speed was classified into four in view of how it changed in response to the partner. Herein, the ordinary speech speed (normal speech speed) of a subject (Mr. A) is denoted by Vda, the ordinary speech speed of the partner (Mr. B) is denoted by Vdb, the subject's speech speed in reading a conversation sentence example n is denoted by Vna, the partner's speech speed in reading the conversation sentence example n is denoted by Vnb. In FIG. 11, each vertical axis indicates the speech speed, wherein the speech speeds Vda, Vna, and Vnb are indicated on the axis.

Case 1(a): In a conversation with a partner who speaks faster than a subject (Vda<Vnb), the subject speaks faster than his/her ordinary speech speed (Vda<Vna).

Case 2(b): In a conversation with a partner who speaks faster than a subject (Vda<Vnb), the subject speaks more slowly than his/her ordinary speech speed (Vda>Vna).

Case 3(c): In a conversation with a partner who speaks more slowly than a subject (Vda>Vnb), the subject speaks faster than his/her ordinary speech speed (Vda<Vna).

Case 4(d): In a conversation with a partner who speaks more slowly than a subject (Vda<Vnb), the subject speaks more slowly than his/her ordinary speech speed (Vda>Vna).

From the positional relationship between the subject's speech speeds Vda, Vna and the partner's speech speed Vnb on the axis of speech speed, whether or not and to what degree the subject adapts to the partner can be obtained. The speech speed might be changed in a direction in accord with the partner when taking in consideration that the entrainment phenomena occurs. Case 1 and Case 4 of the above four cases show the change in the direction in accord with the partner. The amount of change in the subject's speech speed can be obtained by subtracting Vda from Vna (Vna−Vda).

Under the circumstances, the present inventors formulated the following entrainment judging expression.

$$D = \text{sign}(Vnb - Vda) * \text{sign}(Vna - Vda) * \text{abs}(Vna - Vda) \quad \text{(Expression 1)}$$

Wherein, sign is a function for extracting only a sign of plus or minus, and abs is a function for extracting an absolute value. D>0 means that the speech speed is in accord with the partner, and D<0 means that the speech speed is not in accord with the partner. The magnitude of the value D indicates to what degree the speech speed is in accord therewith.

Figure 12:
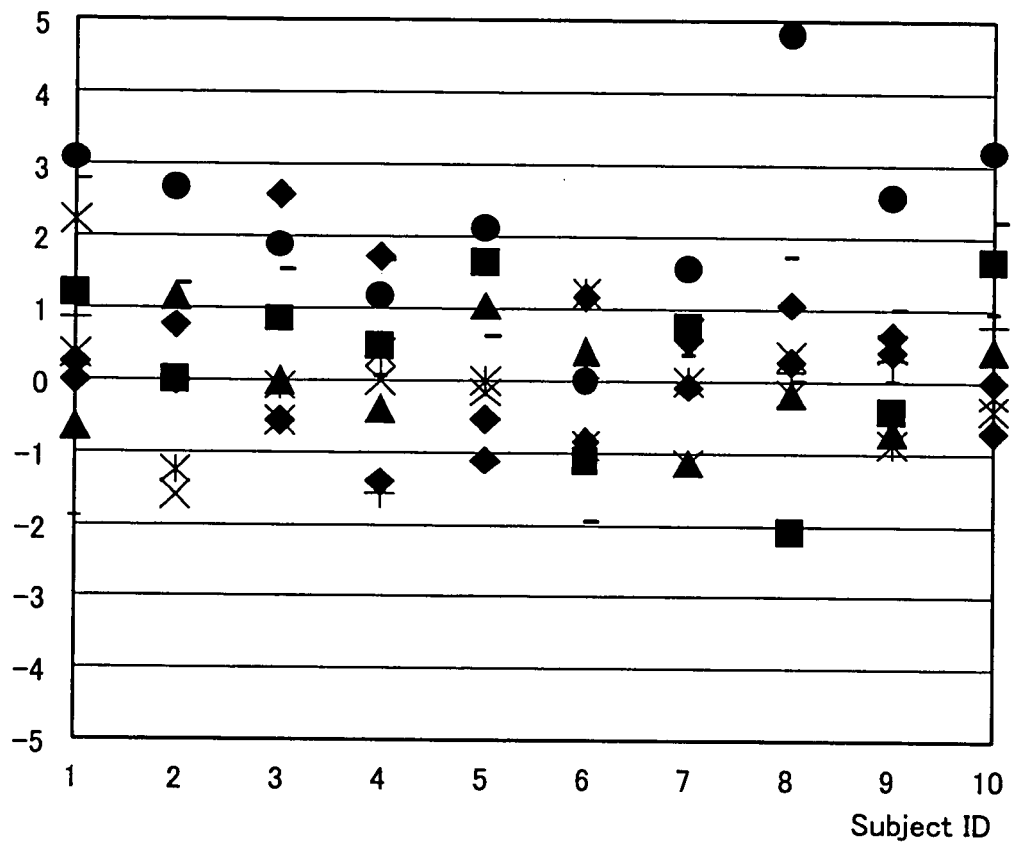
FIG. 12 is a graph indicating results of Experiment 1.

FIG. 12 is a graph in which values D by the above judging expression are plotted in the conversation data obtained in Experiment 1. In FIG. 12, the axis of abscissas indicates the subject IDs and the axis of ordinates indicates the values D by the judging expression, wherein the unit is (characters/second). For example, the judging expression resulted in D=2 when a subject 3 (on the axis of abscissas) made a conversation with a subject 6. From this, the subject 3 was considered to be in accord with the subject 6 by 2 (characters/second).

As can be understood from FIG. 12, the speech speeds were changed in accord with the partners in many speeches. Of the 90 speeches obtained in the experiment, D>0 was obtained in 57 speeches (63%). Also, of 45 conversations composed of the 90 speeches, the subjects tried to be in accord with each other (the values of D of both the subjects were positive) in 18 conversations (40%), Mr. A tried to be in accord with Mr. B while Mr. B was not in accord with Mr. A in 10 conversations (22%), Mr. B tried to be in accord with Mr. A while Mr. A was not in accord with Mr. B in 11 conversation (24%), and both of them were not accord with each other in 6 conversations (13%). In sum, either subject was in accord with the speech speed of the partner in almost all the conversations.

The conversation sentence examples include words read at speed different from ordinary reading speed, such as "Uh," for example. Therefore, factors that change in speech speed so as to adapt to the partner could not be observed in some of the speeches might be that: the speech speed could not be calculated accurately; some subjects were considered to be less susceptible to influence of partner's speech speed; and the like.

As described above, it was confirmed through the interaction experiment between humans in Experiment 1 that the speech speed is liable to be changed so as to adapt to a conversation partner though the subjects read sentences at various reading speeds usually. Also, it was found that this phenomenon was observed irrespective of the contents of the conversation sentences. Further, difference in adaptation characteristic among the subjects was also observed. Thus, adaptation could be promoted further by taking the adaptation characteristic of each subject into consideration.

Experiment 2

The adaptation of speech speed in conversations between humans was observed in Experiment 1. While in Experiment 2, to what degree the speech speed is changed was observed in conversations between the persons and automatic answering equipment. In this experiment, six persons centralized to college students participated.

The automatic answering equipment used in this experiment detects the end of user's speech and replays a speech file recorded in advance, thereby realizing interaction with the user. As the speeches replayed by the equipment, recorded speeches of a conversation sentence which a woman read solo were used. From the recorded speeches, speeches 80% or 120% contracting or extending in the time direction were generated using voice editing software with the pitch value maintained. Accordingly, speech files at three speech speeds were prepared: a file at 80% speech speed (fast speech, HIGH), of which speech speed is the highest where the speech time is converted to 80%; a file at 100% speech speed (as-recorded speech, MIDDLE); and a file at 120% speech speed (slow speech, LOW).

To the subjects, a task of three kinds of interaction with the automatic answering equipment was offered. As the conversation sentences, the conversation sentences 2, 5, 9 were used out of the nine conversation sentences used in Experiment 1. The selected conversation sentences were those in which the subjects were liable to be in accord with the speech speed in Experiment 1. The subjects played a role of Mr. B and the interaction system played a role of Mr. A in the conversations sentences.

FIG. 13 is a table indicating conversation sequences in Experiment 2. In FIG. 13, the first numeral in each column indicates the conversation sentence number, and the initials H, M, and L indicate speech speeds, wherein M is as-recorded speech speed, L is slow speech speed, and H is high speech speed. For example, "2-H" indicates interaction of the conversation sentence 2 at H (high speech speed). As indicated in FIG. 13, a different conversation sentence was offered to each subject every time.

Figure 14:
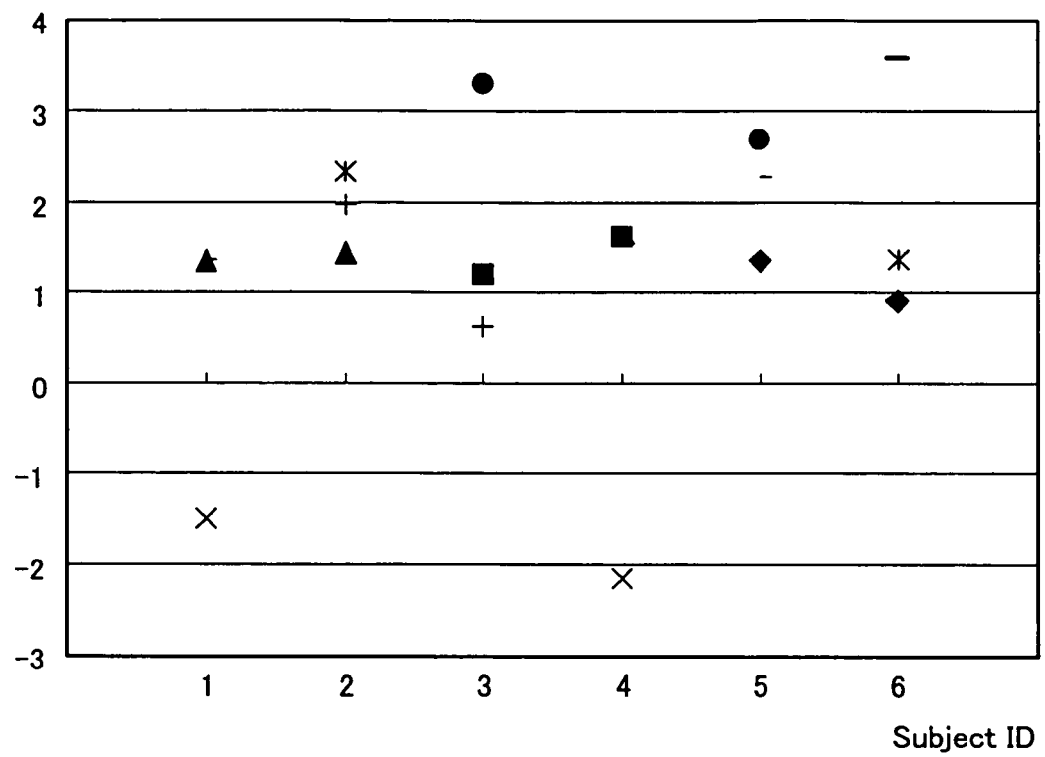
FIG. 14 is a graph indicating results of Experiment 2.

FIG. 14 is a graph in which the values D by the aforementioned judging expression are plotted in the conversation data obtained in Experiment 2. FIG. 14 proves that the subjects adapted their speech speed to that of the equipment in almost all the conversations. Of 18 interactions obtained in the experiment, D>0 was obtained in 16 interactions.

The above two experiments leads to the following consideration: Humans can be influenced so as to change their speech speed in accord with partner's speech speed irrespective of the conversation contents and irrespective of whether the partner is a real human or a speech from the automatic answering equipment. Such change in speech speed is considered to occur in humans with no especial consciousness.

Embodiment 2

Embodiment 2 of the present invention will be described with reference to a robot that performs collaboration with a user as an example. Robots utilized in home or the like perform interchange of a physical object or collaboration in addition to interchange of language and information in its interface with the user, which is a difference from an information terminal, a software agent, and the like. In this case, object operation, gesture, a job, and the like besides information are considered as those provided from the appliance (robot) to the user, and are called "action" in the present embodiment. The "action" includes an aspect of a "manner" of how to provide the action besides a function that the action itself provides. Impression that the user gets differs depending on this "manner." In the present embodiment, an example will be described in which the "manner" for providing the "action" is adjusted for facilitating adaptation by the user.

The speech speed is adjusted according to the state of speech recognition inside the appliance in Embodiment 1. While in the present embodiment, disaccord or accord degree of the "action" output outside with the user's action is referenced in adjusting the action "manner", which is the difference from Embodiment 1.

Next, the manner of providing the action will be described additionally. In general use, in order to smoothly perform collaboration, the robot is required to perform action at speed similarly to user's action speed. However, in the case where the user is in an action at rather higher speed and the action at corresponding speed is beyond the robot's ability due to constraint on its mechanism or the like, or in the case where safety could not be secured if the robot would perform the action at the speed corresponding to the user's action speed, such as a case of giving hot tea or a knife to the user, the robot is required to facilitate user's adaptation so that the user acts at ideal action speed that the robot requests, rather than to perform the action at the action speed corresponding to the user's action speed. When the robot does so, the user takes an action in accord with the robot's action speed with no feeling of dissatisfaction all the time.

Adjustment of the action speed not only realizes smooth collaboration but also gives various impressions to the user collaterally. For example, quick action may give an impression that "the robot works speedily and is trustworthy." In contrast, slow action may give an impression that "the robot is stable."

Further, the robot's action speed influences the user's action speed. Specifically, if interaction would be one having property of causing mutual entrainment between humans, the entrainment could be caused even between the robot and the user. Referring to, for example, a task of giving an object, when the robot gives the object to the user elegantly, the user may receive the object elegantly under the influence of the robot's elegant action.

Embodiment 2 will be described below with reference to FIG. 6 and FIG. 7.

Figure 6:
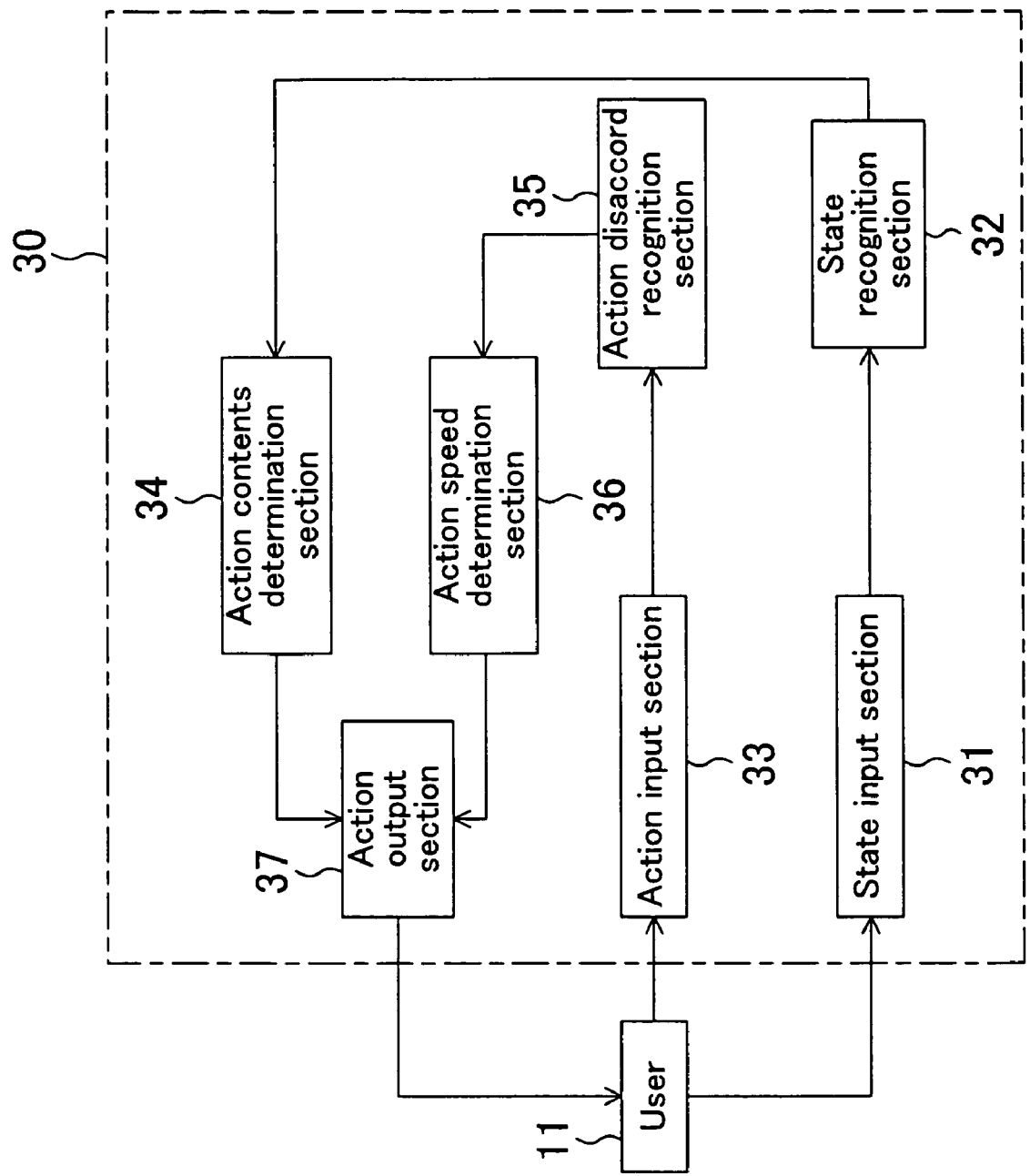
FIG. 6 is a block diagram showing a constitution of an interface unit of a user adaptive system according to Embodiment 2 of the present invention.

FIG. 6 is a block diagram showing a construction of an interface unit 30 in a robot as a user adaptive system according to the present embodiment. Herein, the robot is preconditioned to have an ability of moving autonomously and an object operating ability by its arm so as to move to transfer an object. In FIG. 6, a state input section 31 and an action input section 33 correspond to the input section, and an action disaccord recognition section 35 and an action speed determination section 36 corresponds to the response manner adjusting section. As well, a state recognition section 32, an action contents determination section 34, and an action output section 37 correspond to the input processing section, the response contents determination section, and the output section, respectively.

The state input section 31 obtains a state of the user 11 who is confronting the robot. The state of the user 11 means a direction through gesture to the robot, expression, movement, or the like. The state input section 31 is composed of, for example, a camera for shooting the user 11, a microphone for inputting user's speech, or the like, and is preferably capable of communicating with a sensor (a three-dimensional position sensor, a sudation sensor, an electroencephalograph, or the like) for measuring a physiological state of the user 11.

The state recognition section 32 processes a signal obtained in the state input section 31 and recognizes and outputs the user's 11 state. The output contents thereof are a physiological state of the user 11 or the like, such as user's 11 request contents to the robot, feeling of tiredness, feeling of pleasantness, or the like. Upon receipt of an output from the state recognition section 32, the action contents determination section 34 determines what kind of function or action should be actually output to the user 11.

The action input section 33 is provided for judging whether or not collaboration between the robot and the user 11 is performed well and is composed of a camera for shooting an action of the user 11, a pressure sensor mounted at the robot's hand, or the like. The action input section 33 may share elements of its camera or the like with the state input section 31

The action disaccord recognition section 35 receives an output from the action input section 33 and recognizes disaccord in robot's action with the user's 11 action. The disaccord is used as an index indicative of accord degree of the collaboration between the user 11 and the robot.

Suppose that, for example, the user requests the robot to "bring a magazine to me" and the robot takes up the specified magazine and gives it to the user. In this case, when the speed and the timing are matched between the robot's action of putting out its hand holding the magazine and the user's action of putting out his/her hand for receiving the magazine, smooth magazine passing is realized. If the speed or the timing would not be matched, the user may be subjected to stress or feel dissatisfaction even in such a simple action of receiving a magazine. Specifically, when the robot's hand action is rather faster than the user's action, the user may feel dangerous and would involuntarily draw his/her hand away instead of putting his/her hand out. In reverse, when the robot's hand action is rather slow, the user is kept waiting with his/her hands put out until the magazine comes to his/her hand.

Similarly, in the case where the user passes a cup to the robot with words "store this away," smooth passing would not be enabled if the speed or the timing would not be matched between the user's action and the robot's action.

The action disaccord recognition section 35 recognizes such disaccord in action which would lead to user's dissatisfaction. Specifically, disaccord of the robot's action with the user's action can be recognized by measuring the user's action speed and the robot's action speed from camera images or by measuring a time period between completion of robots' object passing action and user's object receipt. The user's object receipt can be detected by the pressure sensor or the like mounted at the robot's hand.

The action speed determination section 36 determines target collaboration speed with the use of the disaccord in robot's action with the user recognized in the action disaccord recognition section 35 and user's state recognized in the state recognition section 32, with ideal speed for the robot, an impression to give, ideal speed in view of safety, and the like taken into consideration. The action output section 37 outputs to the user 11 the action or the function determined in the action contents determination section 34 at the action speed determined in the action speed determination section 36.

Figure 7:
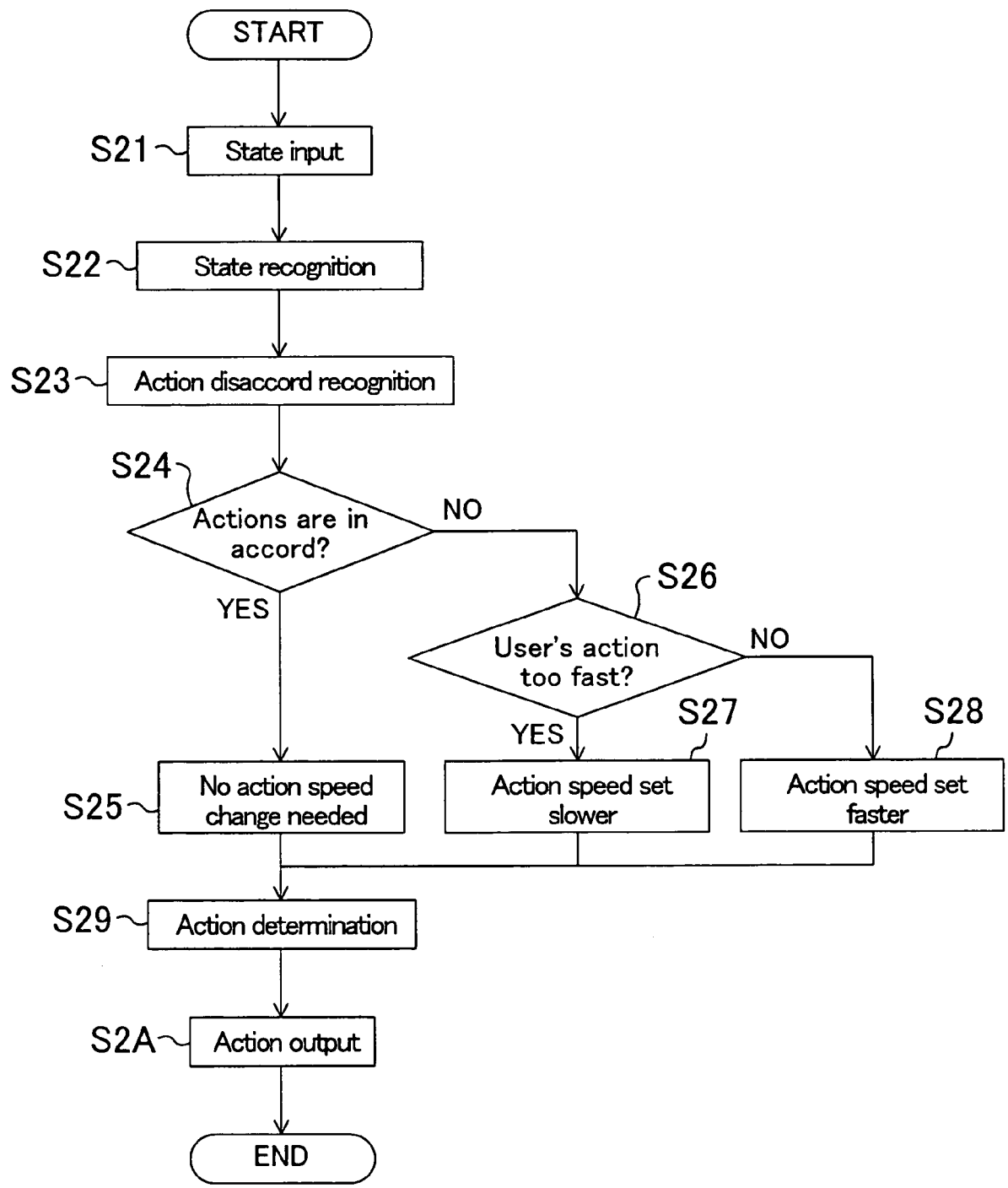
FIG. 7 is a flowchart showing an operation of the constitution in FIG. 6.

FIG. 7 is a flowchart showing an operation of the constitution in FIG. 6. In comparison of the flow in FIG. 7 to the flow in FIG. 5 in Embodiment 1, the principal flows are substantially the same with a difference in the interface with the user (through action or speech (conversation)). Wherein, FIG. 7 includes a step S23 of recognizing action disaccord in collaboration between the user and the robot, which is the difference from FIG. 5. In detail, the present embodiment provides the step S23 for recognizing disaccord of the ideal action speed for the robot with the current user's action speed in order to judge the accord degree of the robot's action, so that the robot's action speed is adjusted according to the recognized action disaccord.

As described above, in the present embodiment, the robot's action speed is adjusted according to the action disaccord therewith in performing collaboration between the user and the robot, attaining further smooth collaboration.

Embodiment 3

Embodiment 3 of the present invention will be described with reference to an information terminal for recommending information to the user as an example. In the present embodiment, an agent is displayed on a screen of the information terminal and the agent presents information according to the user's preference through speech.

The outputting manner such as the speech speed or the like is adjusted according to the speech recognition state in Embodiment 1, and the outputting manner such as the action speed or the like is adjusted according to the action disaccord in collaboration between the user and the robot in Embodiment 2. In the present embodiment, in contrast, the information terminal learns user's preferred model, and information providing manners such as agent's figure (looks), vocabulary, and the like is adjusted according to the learning degree. Namely, the present embodiment is different from Embodiments 1 and 2 in a point that an amount of knowledge relating to the user acquired from the outside is reflected in adjustment of the information providing manner.

An image where the present embodiment is realized is described first with reference to FIG. 8.

Figure 8A:
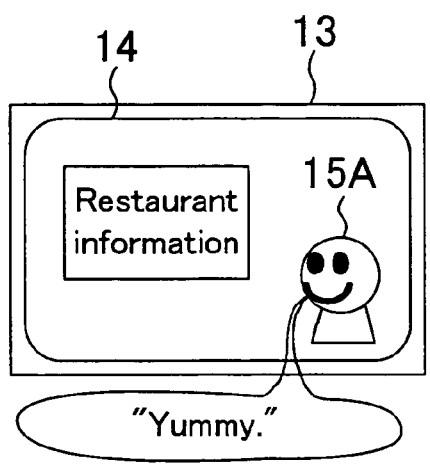
FIG. 8 is a conceptual illustration of Embodiment 3 and shows situations where an information terminal recommends information to a user.
Figure 8B:
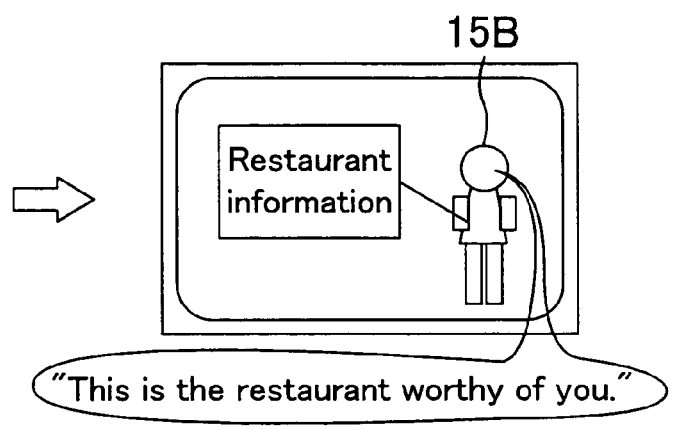

FIG. 8A and FIG. 8B are illustrations each showing conceptually a situation where an information terminal provides restaurant information through an agent to the user. In FIGS. 8, 13 denotes an information terminal having an interface function according to the present embodiment, 14 denotes a display screen, 15A and 15B denote agents. Wherein, FIG. 8A shows the state where user's preferred model is not learned so much and FIG. 8B shows the state where the user's preferred model has been learned.

The information terminal 13 learns the user's preferred model through interaction with the user. At the initial stage of learning, the preferred model is not so learned, and therefore, the information terminal does not know exactly what kind of recommendation information the user prefers. For this reason, if the user excessively looking forward to the information recommending function would not be pleased with the recommended information, the user's discouragement would be great.

In the example shown in FIG. 8A, the agent 15A in a childish style is displayed on the screen 14 and its speech vocabulary is set to baby talk like "yummy." In other words, the information providing manner is adjusted as if a child recommends information so that the information terminal 13 gives not so bad impression even when the user is not pleased with recommended information. This might ease user's annoyance and lessen user's unpleasant feeling.

In contrast, as shown in FIG. 8B, after the user's preferred model has been learned through interaction with the user, the information terminal 13 can recommend information suited for the user's preference with confidence. In this case, a mature agent 15B in formal fashion is displayed on the screen 14 and its speech vocabulary is set to one used by a secretary or a steward like "this is a restaurant worthy of you." Yet childish speech may lose faith in recommended contents.

Thus, adjustment of the information providing manner according to the learning degree of the user's preferred model, such as agent's looks and vocabulary, enables invitation of user's change in impression. Information can be provided in a manner that user's dissatisfaction would be lessened so as not to lose faith in information providing service when recommended information may no be suitable. Further, the degree of user's acceptance can be increased when the recommended information is suitable.

Figure 9:
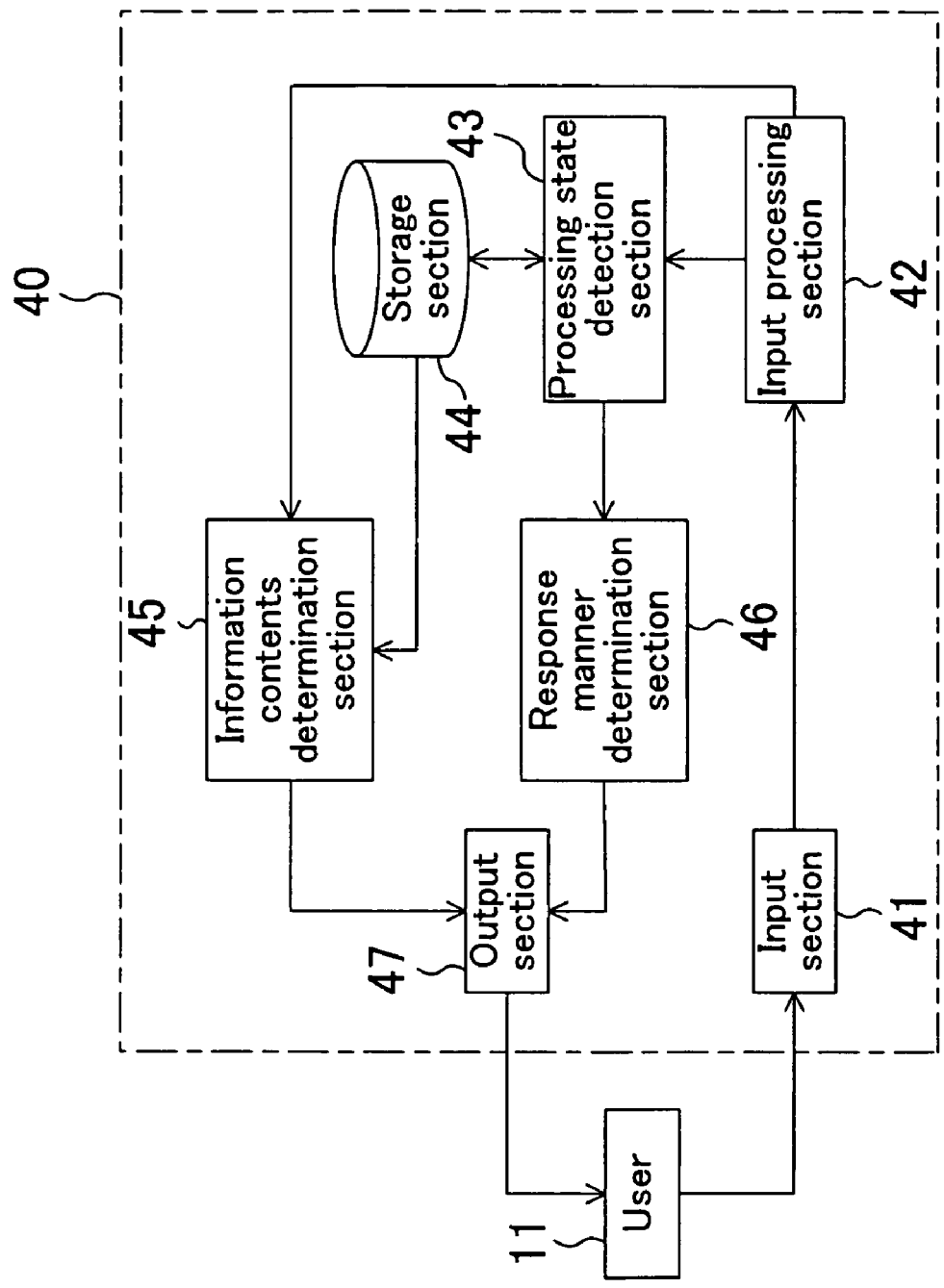
FIG. 9 is a block diagram showing a constitution of an interface unit of a user adaptive system according to Embodiment 3 of the present invention.

FIG. 9 is a block diagram showing a constitution of an interface unit 40 of an information terminal as a user adaptive system according to the present embodiment. In FIG. 9, a processing state detection section 43 and a response manner determination section 46 composes the response manner adjusting section. An input section 41, an input processing section 42, an information contents determination section 45, and an output section 47 correspond to the input section, the input processing section, the response contents determination section, and the output section, respectively.

In FIG. 9, the input section 41 receives an action from the user through a keyboard, a touch panel, a microphone, or the like. The input section 41 converts user's 11 speech or direction to an electric signal. Further, the input section 41 obtains user's reaction to information output from the output section 47 which will be described later. Upon receipt of the signal from the input section 41, the input processing section 42 judges contents that user 11 is requesting. Also, the input processing section 42 obtains information relating to the user's reaction to the information output from the output section 47, such as whether the user is delighted, whether the user is pleased, or the like.

The processing state detection section 43 receives an output from the input processing section 42 and updates user's 11 preferred model stored in a storage section 44. For example, the input processing section 42 stores into the storage section 44 contents requested from the user 11, information contents provided to the user, and user's reaction at the provision in combination. Past history may be stored simply or be categorized. The preferred model stored in the storage section 44 is changed gradually to one with higher accuracy through cumulative interaction with the user 11.

The information contents determination section 45 determines output contents in response to the present user's 11 request by referencing the user's 11 request contents judged in the input processing section 42 and the preferred model stored in the storage section 44.

The response manner determination section 46 adjusts the information providing manner such as vocabulary, agent's looks, and the like, according to the learning degree of the preferred model stored in the storage section 44. In other words, the information providing manner is adjusted according to how exactly the preferred model reflects the user's preference. Then, the output section 47 outputs the information contents determined in the information contents determination section 45 in the information providing manner determined in the response manner determination section 46.

Herein, degree that the user's 11 preference has been grasped is indicated indirectly by adjusting the information providing manner. Specifically, when the user's 11 preference has not been grasped exactly and recommended information would not be necessarily suitable, the recommendation information is provided with the providing manner thereof adjusted. For example, a phrase "would you like . . . ?" or the like is used. In contrast, when the user's 11 preference has been learned fairly, the recommendation information is provided with the providing manner thereof adjusted, also. For example, a phrase "this is suitable for you" or the like is used.

In communication between humans, conversation vocabulary used by strangers at first meet is rather different from that used by known companies. A friendly or distant impression may be given depending on a way of using the vocabulary.

In some conventional methods, friendly conversation is introduced so that the user feels friendly. However, in the information terminal that learns user's preference as in the present embodiment, it is difficult to provide information as expected by the user at the initial stage of learning, and therefore, such friendly talk would lead to user's pique, resulting in counterproductive information provision. Further, it is anticipated that the user cannot feel friendly to all-time polite response even at the advanced stage of learning.

Under the circumstances, in the initial stage where the user's preference has been learned insufficiently, the information is recommended with vocabulary used in conversation between humans at first meet. This can allow the user to understand that unfavorable information is recommended because of unfamiliarity and to think it can't be helped. In contrast, after the user's preference has been learned sufficiently, the friendly information recommendation can allow the user to feel friendly to the system.

Besides the vocabulary, agent's looks to be displayed on the screen may be created by, for example, computer graphics so that the agent is dressed in formalwear in the initial stage of learning and dresses down as the learning advances. In so doing, the impression that the user gets might be changed, thereby attaining smooth communication.

As described above, in the present embodiment, the information providing manner is adjusted according to the level of information recommendation that can be provided to the user or according to the amount of knowledge relating to the user, so that the user can accept recommended information in the cause of nature even if it would be not so suitable. Accordingly, the user's preference can be learned gradually through repetition of natural interaction with the user without making the user especially notice the learning process in the information terminal.

It is noted that the information recommendation is described as an example in the present embodiment but the present embodiment is applicable to other cases such as the case where the user obtains information through conversation with an information terminal.

Further, the functions and the processing in the interface unit in each of the embodiments can be realized through hardware, software, or a combination thereof.

It is also noted that individual cases are described in the above embodiments but an appliance having a hyper function, such as a home use robot or the like, can have a speech interaction ability, a collaboration ability, an information recommending ability, and the like in combination and can adjusts the response manners to the user in parallel or synthetically. Simultaneous adjustment of a plurality of response manners attains further natural communication for the user.

The present invention enables smooth communication between an appliance and a user, and therefore, is useful for general appliances having a user interface, particularly for home use robots, information terminals, home electric appliances in which facilitation of user's adaptation is considered to be effective.

What is claimed is:

1. A user adaptive system comprising an interface unit which performs interaction with a user,
wherein the interface unit includes:
an input section that captures speech spoken by a user as a speech signal;
an input processing section that performs speech recognition of the speech signal obtained by the input section and that detects speech contents of the captured speech;
a response contents determination section for determining speech contents of an output speech to the user to perform an interactive dialogue with the user, on the basis of the speech contents of the captured speech;
a response manner adjusting section that adjusts speech speed of the output speech determined by the response contents determination section, based on a relationship between reliability of the speech recognition performed by the input processing section and the speech speed of the captured speech; and
an output section for outputting the output speech at the speech speed adjusted by the response manner adjusting section,
wherein the response manner adjusting section further comprises a recognition state detection section and a speech speed determination section;

wherein the recognition state detection section obtains a signal indicative of the reliability of the speech recognition performed by the input processing section;

wherein the speech speed determination section adjusts the speech speed at which the output speech is output at the output section, when the reliability of the speech recognition does not meet a predetermined level;

wherein the input processing section determines a speech speed of the captured speech, wherein the speech speed determination section decreases the speech speed of the output speech, when the reliability of the speech recognition does not meet the predetermined level and the speech speed of the captured speech is faster than a predetermined speed.

2. The system of claim 1, wherein the predetermined speed is an optimum speech speed for speech recognition by the input processing section.

3. A user adaptive system comprising an interface unit which performs interaction with a user, wherein the interface unit includes:

an input section that captures speech spoken by a user as a speech signal;

an input processing section that performs speech recognition of the speech signal obtained by the input section and that detects speech contents of the captured speech;

a response contents determination section for determining speech contents of an output speech to the user to perform an interactive dialogue with the user, on the basis of the speech contents of the captured speech;

a response manner adjusting section that adjust speech speed of the output speech determined by the response contents determination section, based on a relationship between reliability of the speech recognition performed by the input processing section and the speech speed of the captured speech; and an output section for outputting the output speech at the speech speed adjusted by the response manner adjusting section, wherein the response manner adjusting section further comprises a recognition state detection section and a speech speed determination section;

wherein the recognition state detection section obtains a signal indicative of the reliability of the speech recognition performed by the input processing section;

wherein the speech speed determination section adjusts the speech speed at which the output speech is output at the output section, when the reliability of the speech recognition does not meet a predetermined level;

wherein the input processing section determines a speech speed of the captured speech, wherein the speech speed determination section increases the speech speed of the output speech, when the reliability of the speech recognition does not meet the predetermined level and the speech speed of the captured speech is slower than a predetermined speed.

4. The system of claim 3, wherein the predetermined speed is an optimum speech speed for speech recognition by the input processing section.

5. A user adaptive system comprising an interface unit which performs interaction with a user, wherein the interface unit includes:

an input section that captures speech spoken by a user as a speech signal;

an input processing section that performs speech recognition of the speech signal obtained by the input section and that detects speech contents of the captured speech;

a response contents determination section for determining speech contents of an output speech to the user to perform an interactive dialogue with the user, on the basis of the speech contents of the captured speech;

a response manner adjusting section that adjust speech speed of the output speech determined by the response contents determination section, based on a relationship between reliability of the speech recognition performed by the input processing section and the speech speed of the captured speech; and an output section for outputting the output speech at the speech speed adjusted by the response manner adjusting section, wherein the response manner adjusting section further comprises a recognition state detection section and a speech speed determination section;

wherein the recognition state detection section obtains a signal indicative of the reliability of the speech recognition performed by the input processing section;

wherein the speech speed determination section adjusts the speech speed at which the output speech is output at the output section, when the reliability of the speech recognition does not meet a predetermined level;

wherein the reliability of the speech recognition performed by the input processing section is a proportion of the captured speech correctly recognized by the input processing section.

6. A user adaptive system comprising an interface unit which performs interaction with a user, wherein the interface unit includes:

an input section that captures speech spoken by a user as a speech signal;

an input processing section that performs speech recognition of the speech signal obtained by the input section and that detects speech contents of the captured speech;

a response contents determination section for determining speech contents of an output speech to the user to perform an interactive dialogue with the user, on the basis of the speech contents of the captured speech;

a response manner adjusting section that adjust speech speed of the output speech determined by the response contents determination section, based on a relationship between reliability of the speech recognition performed by the input processing section and the speech speed of the captured speech; and an output section for outputting the output speech at the speech speed adjusted by the response manner adjusting section, wherein the response manner adjusting section further comprises a recognition state detection section and a speech speed determination section that selectively adjusts the speech speed at which the output speech is output at the output section;

wherein the recognition state detection section obtains a signal indicative of the reliability of the speech recognition performed by the input processing section;

wherein the speech speed determination section does not adjust the speech speed at which the output speech is output at the output section, when the reliability of the speech recognition meets a predetermined level.

7. A controlling method for performing interaction with a user in a user adaptive system, comprising:

a first step of obtaining a speech of the user as a speech signal;

a second step of performing speech recognition of the speech signal obtained in the first step and detecting speech contents of the user;

a third step of determining speech contents to the user to perform an interactive dialogue with the user, on the basis of the speech contents of the user detected in the second step;

a fourth step of adjusting speech speed of the speech contents determined in the third step on the basis of user's adaptation characteristics indicating a degree of speech speed of the user is changed upon influence of speech speed of the user adaptive system; and a fifth step of outputting the speech contents determined in the third step through a speaker device at the speech speed adjusted in the fourth step, where the fourth step further comprises determining the user's adaptation characteristic;

wherein the fifth step further comprises outputting speech contents that request the user to change a speech speed of the user, when the users adaptation characteristic is determined in the fourth step as not changed upon influence of the speech speed of the user adaptive system.

* * * * *